United States Patent
Yashiro et al.

(10) Patent No.: US 11,824,155 B2
(45) Date of Patent: Nov. 21, 2023

(54) ALL-SOLID LITHIUM SECONDARY BATTERY AND METHOD OF CHARGING THE SAME

(71) Applicant: Samsung Electronics Co., Ltd., Suwon-si (KR)

(72) Inventors: Nobuyoshi Yashiro, Yokohama (JP); Naoki Suzuki, Yokohama (JP); Yuichi Aihara, Yokohama (JP)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 308 days.

(21) Appl. No.: 16/846,900

(22) Filed: Apr. 13, 2020

(65) Prior Publication Data
US 2020/0373609 A1 Nov. 26, 2020

(30) Foreign Application Priority Data

May 21, 2019 (JP) .................................. 2019-095156
Aug. 9, 2019 (KR) ......................... 10-2019-0097640

(51) Int. Cl.
*H01M 10/0525* (2010.01)
*H01M 4/02* (2006.01)
(Continued)

(52) U.S. Cl.
CPC ......... *H01M 10/0525* (2013.01); *H01M 4/38* (2013.01); *H01M 4/662* (2013.01); *H01M 4/667* (2013.01); *H01M 10/0562* (2013.01); *H01M 10/0585* (2013.01); *H01M 10/44* (2013.01); *H01M 2004/021* (2013.01); *H01M 2004/027* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 5,114,810 A | | 5/1992 | Frysz et al. |
| 6,030,726 A | * | 2/2000 | Takeuchi .......... H01M 10/0525 |
| | | | 429/231.95 |

(Continued)

FOREIGN PATENT DOCUMENTS

| | | |
|---|---|---|
| CN | 102362384 A | 2/2012 |
| CN | 103190026 A | 7/2013 |

(Continued)

OTHER PUBLICATIONS

Guangyuan Zheng et al., "Interconnected hollow carbon nanospheres for stable lithium metal anodes," Nature Nanotechnology, Jul. 27, 2014, pp. 1-6, DOI: 10.1038/NNANO.2014.152.

(Continued)

*Primary Examiner* — Haixia Zhang
(74) *Attorney, Agent, or Firm* — CANTOR COLBURN LLP

(57) ABSTRACT

An all-solid lithium secondary battery includes: a positive active material layer; a solid electrolyte layer; and a negative active material layer, which is capable of forming an alloy or a compound with lithium, wherein the solid electrolyte layer is between the positive active material layer and the negative active material layer, and wherein the negative active material layer comprises silver (Ag).

24 Claims, 4 Drawing Sheets

(51) Int. Cl.
*H01M 10/0585* (2010.01)
*H01M 4/38* (2006.01)
*H01M 4/66* (2006.01)
*H01M 10/44* (2006.01)
*H01M 10/0562* (2010.01)

(56) References Cited

U.S. PATENT DOCUMENTS

| | | |
|---|---|---|
| 6,303,017 B1 | 10/2001 | Page et al. |
| 6,402,795 B1 | 6/2002 | Chu et al. |
| 6,884,546 B1 | 4/2005 | Fujita et al. |
| 7,150,941 B2 | 12/2006 | Fujita et al. |
| 7,556,881 B2 | 7/2009 | Yanagida et al. |
| 7,601,318 B2 | 10/2009 | Armand et al. |
| 8,088,514 B2 | 1/2012 | Takami et al. |
| 8,137,845 B2 | 3/2012 | Kim et al. |
| 8,507,135 B2 | 8/2013 | Joachim et al. |
| 8,628,883 B2 | 1/2014 | Ishida et al. |
| 8,922,171 B2 | 12/2014 | Shimizu et al. |
| 9,166,222 B2 | 10/2015 | Amiruddin et al. |
| 9,466,837 B1 | 10/2016 | Yoon et al. |
| 9,806,373 B2 | 10/2017 | Kambara et al. |
| 9,887,415 B2 | 2/2018 | Fischer et al. |
| 9,923,195 B2 | 3/2018 | Amiruddin et al. |
| 10,985,407 B2 | 4/2021 | Suzuki et al. |
| 2003/0003364 A1 | 1/2003 | Mori et al. |
| 2003/0129497 A1 | 7/2003 | Yamamoto et al. |
| 2005/0164087 A1* | 7/2005 | Fujita ............... H01M 10/052 429/231.95 |
| 2006/0141359 A1 | 6/2006 | Yanagida et al. |
| 2007/0218333 A1 | 9/2007 | Iwamoto |
| 2010/0151331 A1 | 6/2010 | Sun et al. |
| 2011/0104568 A1 | 5/2011 | Sung et al. |
| 2011/0171502 A1 | 7/2011 | Kottenstette et al. |
| 2012/0009452 A1 | 1/2012 | Ueda |
| 2013/0084499 A1 | 4/2013 | Yanagita et al. |
| 2013/0298386 A1 | 11/2013 | Tarascon et al. |
| 2014/0027291 A1 | 1/2014 | Vidal et al. |
| 2014/0072866 A1 | 3/2014 | Kitada et al. |
| 2014/0093783 A1 | 4/2014 | Lamanna et al. |
| 2014/0093786 A1 | 4/2014 | Ito et al. |
| 2014/0127557 A1 | 5/2014 | Kasahara et al. |
| 2014/0329118 A1 | 11/2014 | Nagase et al. |
| 2015/0147660 A1 | 5/2015 | Fujiki et al. |
| 2015/0162604 A1 | 6/2015 | Park et al. |
| 2016/0013462 A1 | 1/2016 | Cui et al. |
| 2016/0043392 A1 | 2/2016 | Fujiki et al. |
| 2016/0149259 A1 | 5/2016 | Osada et al. |
| 2016/0172660 A1 | 6/2016 | Fischer et al. |
| 2016/0172661 A1 | 6/2016 | Fischer et al. |
| 2016/0233553 A1 | 8/2016 | Yamasaki et al. |
| 2016/0329603 A1 | 11/2016 | Labyedh et al. |
| 2016/0372784 A1 | 12/2016 | Hayner et al. |
| 2016/0372798 A1 | 12/2016 | Ishii |
| 2017/0155127 A1 | 6/2017 | Shindo et al. |
| 2017/0162901 A1 | 6/2017 | Chen et al. |
| 2017/0170467 A1 | 6/2017 | Miki |
| 2017/0187066 A1 | 6/2017 | Tsujimura et al. |
| 2017/0222272 A1 | 8/2017 | Takami et al. |
| 2017/0237116 A1* | 8/2017 | Shindo ............... H01M 50/136 429/127 |
| 2017/0309914 A1 | 10/2017 | Drews et al. |
| 2018/0102531 A1 | 4/2018 | Fischer et al. |
| 2018/0102532 A1 | 4/2018 | Fischer et al. |
| 2018/0198118 A1 | 7/2018 | Amiruddin et al. |
| 2019/0157723 A1 | 5/2019 | Suzuki et al. |
| 2019/0207209 A1 | 7/2019 | Venkatachalam et al. |
| 2019/0214677 A1 | 7/2019 | Yamada et al. |
| 2022/0384778 A1 | 12/2022 | Amiruddin et al. |

FOREIGN PATENT DOCUMENTS

| | | |
|---|---|---|
| CN | 103560267 A | 2/2014 |
| CN | 107112481 A | 8/2017 |
| EP | 1923935 A1 | 5/2008 |
| JP | 1996511581 A | 12/1996 |
| JP | 11310405 A | 11/1999 |
| JP | 2001313024 A | 11/2001 |
| JP | 2002237293 A | 8/2002 |
| JP | 2002280073 A | 9/2002 |
| JP | 2002373707 A | 12/2002 |
| JP | 2003123740 A | 4/2003 |
| JP | 2004509058 A | 3/2004 |
| JP | 2004185975 A | 7/2004 |
| JP | 2004213946 A | 7/2004 |
| JP | 2005285647 A | 10/2005 |
| JP | 2005353309 A | 12/2005 |
| JP | 200612761 A | 1/2006 |
| JP | 2006107812 A | 4/2006 |
| JP | 2006269345 A | 10/2006 |
| JP | 3989945 B2 | 10/2007 |
| JP | 2008300148 A | 12/2008 |
| JP | 201073544 A | 4/2010 |
| JP | 2010219047 A | 9/2010 |
| JP | 201186554 A | 4/2011 |
| JP | 2011086554 A | 4/2011 |
| JP | 2011090876 A | 5/2011 |
| JP | 2011165343 A | 8/2011 |
| JP | 201249001 A | 3/2012 |
| JP | 2012138372 A | 7/2012 |
| JP | 201365453 A | 4/2013 |
| JP | 2013080616 A | 5/2013 |
| JP | 2013089423 A | 5/2013 |
| JP | 2013516746 A | 5/2013 |
| JP | 2013125697 A | 6/2013 |
| JP | 2013529830 A | 7/2013 |
| JP | 2013201110 A | 10/2013 |
| JP | 2014502006 A | 1/2014 |
| JP | 2014510385 A | 4/2014 |
| JP | 201496311 A | 5/2014 |
| JP | 2014096311 A | 5/2014 |
| JP | 2014116154 A | 6/2014 |
| JP | 201571930 A | 1/2015 |
| JP | 201565029 A | 4/2015 |
| JP | 2015103451 A | 6/2015 |
| JP | 2015115319 A | 6/2015 |
| JP | 201639006 A | 3/2016 |
| JP | 2016041219 A | 3/2016 |
| JP | 2017111930 A | 6/2017 |
| JP | 201892955 A | 6/2018 |
| JP | 2019096610 A | 6/2019 |
| KR | 1020060076716 A | 7/2006 |
| KR | 1020140022253 A | 2/2014 |
| KR | 1020140036660 A | 3/2014 |
| KR | 1020140074174 A | 6/2014 |
| WO | 0122519 A1 | 3/2001 |
| WO | 2012060349 A1 | 5/2012 |
| WO | 2012061191 A2 | 5/2012 |
| WO | 2012098551 A1 | 7/2012 |
| WO | 2013084302 A1 | 6/2013 |

OTHER PUBLICATIONS

Kai Yan et al., "Selective deposition and stable encapsulation of lithium through heterogeneous seeded growth," Nature Energy, Feb. 22, 2016, pp. 1-8, vol. 1, Article No. 16010, DOI: 10.1038/NENERGY.2016.10.

Naoki Suzuki et al., "Synthesis and Electrochemical Properties of I$\bar{4}$-Type Li1+2xZn1-xPS4 Solid Electrolyte," Chemistry of Materials, Mar. 9, 2018, pp. 2236-2244, vol. 30.

"Safety Requirements For Portable Sealed Secondary Cells, And For Batteries Made From Them, For Use In Portable Applications", Japanese Standards Association, JISC8712:2015.

Guangyuan Zheng et al., Interconnected hollow carbon nanospheres for stable lithium metal anodes, Nature Nanotechnology, DOI: 10.1038/nnano.2014.152, Jul. 27, 2014, pp. 618-623, vol. 9, 2014 Macmillan Publishers Limited.

Suzuki, N., et al., "Synthesis and Electrochemical Properties of I$\bar{4}$-Type Li1+2xZn1-xPS4 Solid Electrolyte," Chemistry of Materials, Mar. 9, 2018, vol. 30, pp. 2236-2244.

(56) References Cited

OTHER PUBLICATIONS

Takashi Hakari et al., "All-solid-state lithium batteries with Li3PS4 glass as active material", Journal of Power Sources, Jun. 9, 2015, pp. 721-725, vol. 293.
Turnbaugh PL et al., An obesity-associated gut microbiome with increased capacity for energy harvest, Published: Dec. 21, 2006, pp. 1027-1031, vol. 444, 2006 Nature PublishingGroup.
Japanese Office Action for Japanese Patent Application for 2019-095156 dated Mar. 14, 2023.
Japanese Office Action for Japanese Patent Application No. 2019-095156 dated Mar. 14, 2023.

* cited by examiner

US 11,824,155 B2

ALL-SOLID LITHIUM SECONDARY BATTERY AND METHOD OF CHARGING THE SAME

CROSS-REFERENCE TO RELATED APPLICATIONS

This application claims priority to and the benefit of Japanese Patent Application No. 2019-095156, filed on May 21, 2019, in the Japanese Patent Office, and Korean Patent Application No. 10-2019-0097640, filed on Aug. 9, 2019, in the Korean Intellectual Property Office, and all the benefits accruing therefrom under 35 U.S.C. § 119, the contents of which are incorporated herein in their entirety by reference.

BACKGROUND

1. Field

The present disclosure relates to an all-solid lithium secondary battery and methods of charging the same.

2. Description of the Related Art

Recently, all-solid lithium secondary batteries, which include a solid electrolyte as an electrolyte have drawn attention. In order to increase the specific energy of these all-solid lithium secondary batteries, it has been suggested that lithium be used as a negative active material. The specific capacity (capacity per unit weight) of lithium is about 10 times the specific capacity of graphite, which is often used as a negative active material. Thus, thinner all-solid lithium secondary batteries having improved specific capacity may be manufactured by using lithium as a negative active material.

Nonetheless, there remains a need for improved battery materials for all-solid lithium secondary batteries having high discharge capacity without applying a high external pressure.

SUMMARY

Provided is an all-solid lithium secondary battery having high discharge capacity without applying a high external pressure.

Provided are methods of charging the all-solid lithium secondary batteries.

Additional aspects will be set forth in part in the description that follows and, in part, will be apparent from the description, or may be learned by practice of the presented embodiments of the disclosure.

According to an aspect of an embodiment, an all-solid lithium secondary battery includes: a positive active material layer; a solid electrolyte layer; and a negative active material layer, which is capable of forming an alloy or a compound with lithium, wherein the solid electrolyte layer is between the positive active material layer and the negative active material layer, and wherein the negative active material layer comprises silver (Ag).

The negative active material layer may comprise Ag in a range of about 10 percent by weight (wt %) to 100 wt %, based on 100 wt % of a total amount of negative active materials included in the negative active material layer.

The amount of the Ag per unit area in the negative active material layer may be in the range of about 0.05 milligram per square centimeter ($mg/cm^2$) to about 5 $mg/cm^2$, based on the total weight of the negative active material layer.

The negative active material layer may further comprise carbon, gold, platinum, palladium, silicon, aluminum, bismuth, tin, indium, zinc, or a combination thereof.

The negative active material layer may include Ag in the form of silver particles disposed therein, or wherein the negative active material comprises silver in the form of a silver layer disposed thereon.

The all-solid lithium secondary battery may further include a negative current collector, wherein a metal layer including lithium may be between the negative current collector and the negative active material layer, inside the negative active material layer, or both, in an overcharged state.

The metal layer including lithium may include a Li(Ag) alloy including a $\gamma_1$-phase, a $\beta$-Li phase, or a combination thereof.

The solid electrolyte layer may include a sulfide-based solid electrolyte.

An external pressure applied to the positive active material layer, the solid electrolyte layer, and the negative active material layer may be about 1.0 megapascal (MPa) or less.

According to an aspect of another embodiment, an all-solid lithium secondary battery includes: a positive electrode layer; a solid electrolyte layer and a negative electrode layer, wherein the solid electrolyte layer is between the positive electrode layer and the negative electrode layer, wherein the negative electrode layer includes a negative current collector and a negative active material layer, wherein the negative active material layer includes amorphous carbon (C) and silver (Ag), and an amount of the Ag is in a range of about 10 wt % to 100 wt %, based on 100 wt % of the total amount of negative active materials included in the negative active material layer.

The negative current collector may include a nickel (Ni) foil, a copper (Cu) foil coated with Ni, a stainless steel foil, or a combination thereof.

According to an aspect of another embodiment, a method of charging the all-solid lithium secondary battery is provided by determining a charging capacity of the negative active material layer; and applying a current to the all-solid lithium secondary battery in an amount to exceed the capacity of the negative active material layer to charge the all-solid lithium secondary battery.

A charging amount of charging the all-solid lithium secondary battery may be about two to about 100 times greater than a charging capacity of the negative active material layer.

Also disclosed it a method of preparing an all-solid lithium secondary battery, the method including: providing a positive active material layer; providing a solid electrolyte layer; and providing a negative active material layer, which is capable of forming an alloy or a compound with lithium, wherein the solid electrolyte layer is between the positive active material layer and the negative active material layer, and wherein the negative active material layer includes silver.

BRIEF DESCRIPTION OF THE DRAWINGS

The above and other aspects, features, and advantages of various embodiments of the disclosure will be more apparent from the following description taken in conjunction with the accompanying drawings, in which.

DETAILED DESCRIPTION

Figure 1:
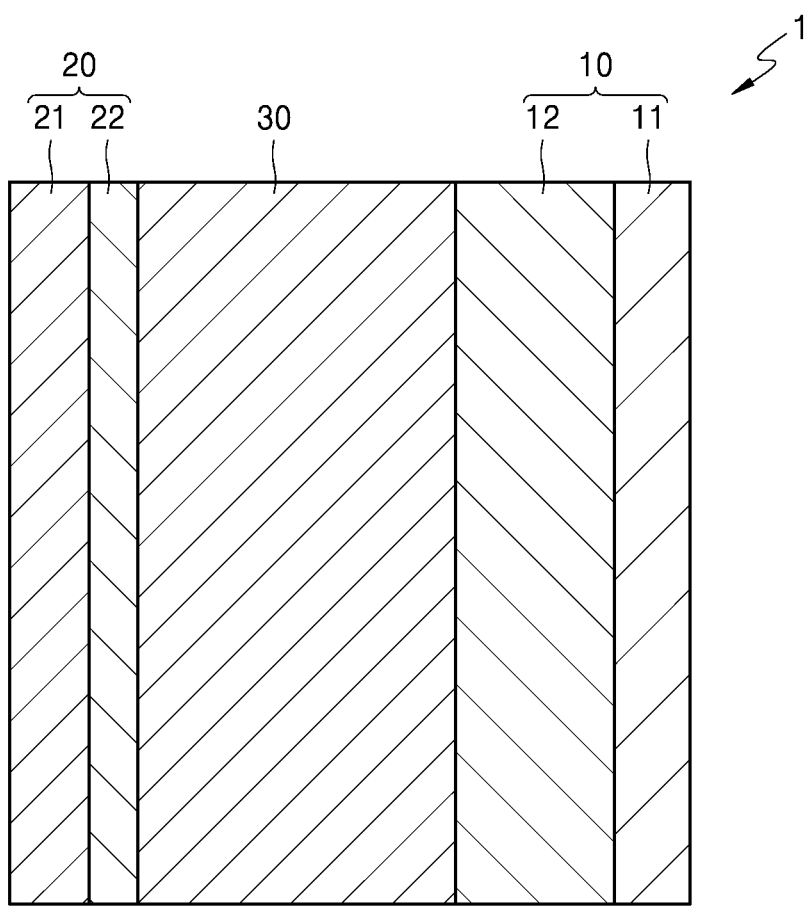
FIG. 1 is a cross-sectional view schematically illustrating a configuration of an embodiment of an all-solid lithium secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

Hereinafter, an all-solid lithium secondary battery and a method of charging the same according to an embodiment will be described in detail with reference to the accompanying drawings. The following description is for the purpose of describing particular embodiments and the present disclosure is not limited thereby. The present disclosure is only defined by the scope of claims.

Throughout the specification, the term "include" or "have" is intended to indicate that an element does not preclude the other elements but further add another element, unless otherwise stated.

As used herein, the term "combination" includes a mixture, an alloy, a reaction product, and the like unless otherwise stated. An expression used in the singular encompasses the expression of the plural, unless otherwise indicated or it has a clearly different meaning in the context. Also, it will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

It will be understood that when an element is referred to as being "on" another element, it can be directly on the other element or intervening elements may be present therebetween. In contrast, when an element is referred to as being "directly on" another element, there are no intervening elements present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can, therefore, encompasses both an orientation of "lower" and "upper," depending on the particular orientation of the figure. Similarly, if the device in one of the figures is turned over, elements described as "below," or "beneath" other elements would then be oriented "above" the other elements. The exemplary terms "below" or "beneath" can, therefore, encompass both an orientation of above and below.

The term "or" refers to "and/or," unless otherwise stated. As used herein, the terms "an embodiment," "embodiments," and the like indicate that elements described with regard to an embodiment are included in at least one embodiment described in this specification and may or may not present in other embodiments. In addition, it may be understood that the described elements are combined in any suitable manner in various embodiments.

Unless otherwise defined, all terms including technical and scientific terms used herein have the same meaning as commonly understood by one of ordinary skill in the art to which this disclosure belongs. All patents, patent applications, and other cited references are incorporated herein by reference in their entirety. However, in the event of any conflict or inconsistency between terms used herein and terms of the cited references, the terms used in this specification take precedence over the terms of the cited references. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modification, variations, improvements, and substantial equivalents.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

1. Configuration of All-Solid Lithium Secondary Battery

FIG. 1 is a cross-sectional view schematically illustrating a configuration of an embodiment of an all-solid lithium secondary battery.

An all-solid lithium secondary battery 1 according to an embodiment may be a lithium-ion secondary battery in which lithium ions move between a positive electrode and a negative electrode when the battery is charged and discharged. Specifically, the all-solid lithium secondary battery 1 includes a positive electrode layer 10, a negative electrode layer 20, and a solid electrolyte layer 30 interposed between the positive electrode layer 10 and the negative electrode layer 20 as shown in FIG. 1.

Positive Electrode Layer

The positive electrode layer 10 includes a positive current collector 11, and a positive active material layer 12 between the positive current collector and the negative electrode layer 20.

The positive current collector 11 may be in the form of a plate or foil. The positive current collector 11 may comprise a metal such as indium, copper, magnesium, stainless steel, titanium, iron, cobalt, nickel, zinc, aluminum, germanium, lithium, or an alloy of thereof. The positive active material layer 12 may intercalate and allow deintercalation of lithium ions reversibly. The positive active material layer 12 may include a positive active material and a solid electrolyte.

The positive active material may be a compound that can intercalate and deintercalate lithium.

Examples of the positive active material include compounds represented by the following formulae: $Li_aA_{1-b}B'_bD'_2$ (where $0.90 \leq a \leq 1.8$ and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the foregoing formulae for the positive active material, A is Ni, Co, Mn, or a combination thereof; B' is Al, Ni, Co, Mn, Cr, Fe, Mg, Sr, V, a rare earth element, or a combination thereof; D' is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. The rare earth element may be cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), or yttrium (Y).

Examples of the positive active material may be lithium transition metal compounds such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, lithium iron phosphate, lithium sulfide, or a combination of thereof. The positive active material layer 12 may include a single compound, or two or more compounds, as the positive active material.

The positive active material may include a lithium transition metal oxide having a layered rock-salt type structure. As used herein, the term "layered rock-salt type structure" is a structure in which a layer of oxygen atoms and a layer of metal atoms are alternately arranged regularly in the <111> direction of a cubic rock-salt type structure such that each atomic layer forms a two-dimensional plane. In addition, the term "cubic rock-salt type structure" refers to a sodium chloride-type structure as one of the crystal structures. For example, the "cubic rock-salt type structure" indicates a structure in which face-centered cubic lattices respectively formed of anions and cations are misarranged by half the side of each unit lattice.

Examples of the lithium transition metal oxide having a layered rock-salt type structure include ternary transition metal oxides represented by the formula $LiNi_xCo_yAl_zO_2$ (NCA) or $LiNi_xCo_yMn_zO_2$ (NCM) (where $0<x<1$, $0<y<1$, $0<z<1$, and $x+y+z=1$). When the positive active material layer 12 includes a lithium ternary transition metal oxide having such a layered rock-salt type structure as the positive active material, energy density and thermal stability of the all-solid lithium secondary battery 1 may be improved.

The positive active material may be a particle having a spherical shape or an elliptical shape. Also, a particle diameter of the positive active material is not particularly limited and may be within a range suitable for a positive active material of an all-solid lithium secondary battery. Also, the amount of the positive active material included in the positive active material layer 12 is not particularly limited, and may be within a range suitable for a positive electrode layer of an all-solid lithium secondary battery.

The compound having a coating layer on the surface thereof, or a mixture of the compound without a coating layer and a compound having a coating layer may be used. The coating layer may include a compound of a coating element, such as an oxide, hydroxide, oxyhydroxide, oxycarbonate, or hydroxycarbonate of the coating element. The compound constituting the coating layer may be amorphous or crystalline. The coating element included in the coating layer may be Mg, Al, Co, K, Na, Ca, Si, Ti, V, Sn, Ge, Ga, B, As, Zr, or a combination thereof. Any suitable coating method, which does not adversely affect physical properties of the positive active material, e.g., spray coating or immersing, may be used for forming the coating layer. These methods are known to those of ordinary skill in the art, and thus detailed descriptions thereof will not be given. For example, the coating layer may be formed of $Li_2O$—$ZrO_2$.

The solid electrolyte included in the positive active material layer 12 may be the same type as or different type from that of a solid electrolyte included in the solid electrolyte layer 30, which is further described below.

The positive active material layer 12 may further include an additive such as a conductive agent, a binder, a filler, a dispersant, and an ion-conductive adjuvant, which are appropriately mixed, in addition to the positive active material and the solid electrolyte.

For example, the conductive agent may be graphite, carbon black, acetylene black, Ketjen black, carbon fiber, or metal powder. Also, the binder may be, for example, styrene butadiene rubber (SBR), polytetrafluoroethylene, polyvinylidene fluoride, or polyethylene. In addition, the filler, the dispersant, or the ion-conductive adjuvant may be any known material commonly used in electrodes of all-solid lithium secondary batteries.

Negative Electrode Layer

The negative electrode layer 20 may include a negative current collector 21 and a negative active material layer 22, wherein the negative active material layer 22 is between the negative current collector 21 and the positive electrode layer 10.

The negative current collector 21 may be in the form of a plate or a foil. The negative current collector 21 may include a material, which does not react, e.g., does not form an alloy nor a compound, with lithium. Examples of the material constituting the negative current collector 21 may include copper, stainless steel, titanium, iron, cobalt, and nickel. The negative current collector 21 may comprise a metal or an alloy of the foregoing.

Figure 2:
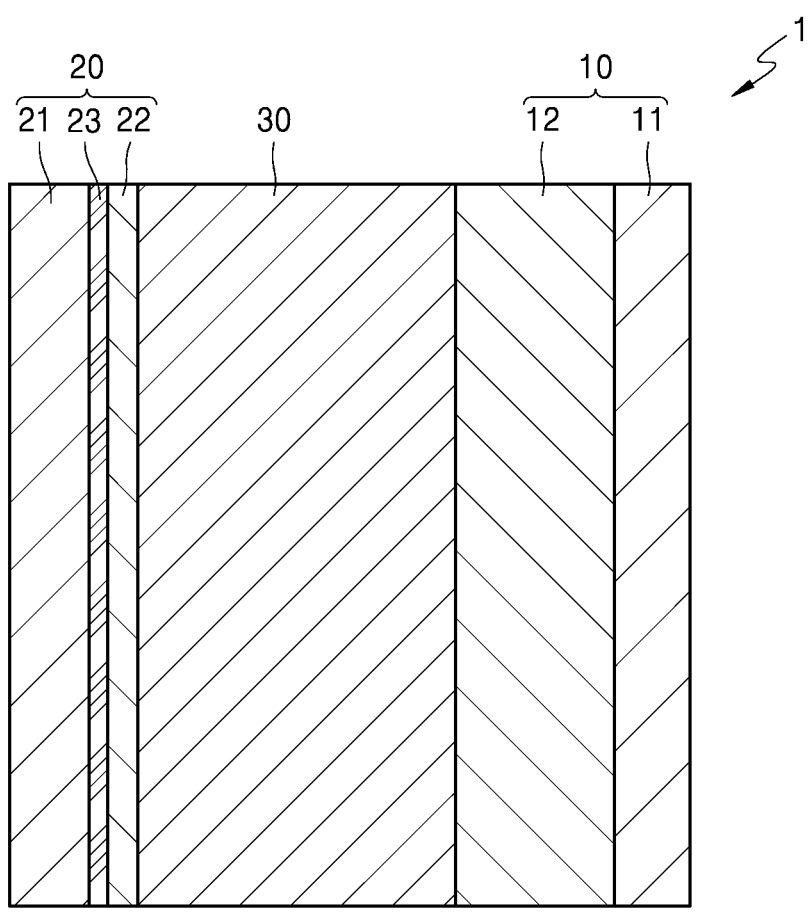
FIG. 2 is a cross-sectional view schematically illustrating a configuration of an all-solid lithium secondary battery according to an embodiment after overcharging a negative active material layer.
Figure 3:
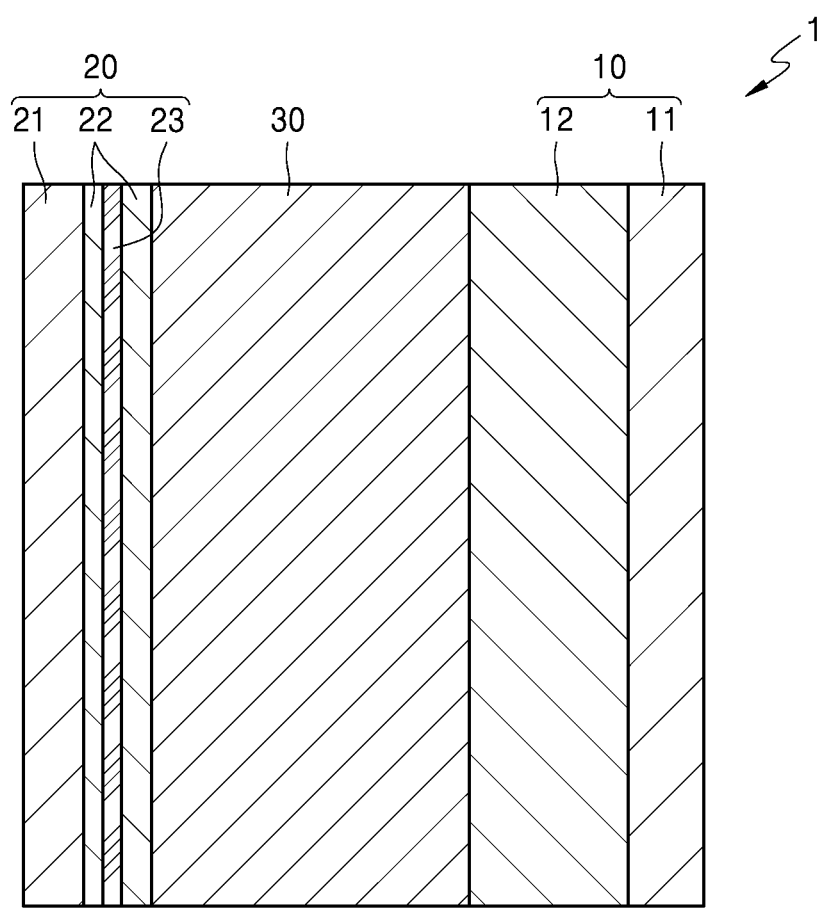
FIG. 3 is a cross-sectional view illustrating a modified example of an all-solid lithium secondary battery according to another embodiment.
Figure 4:
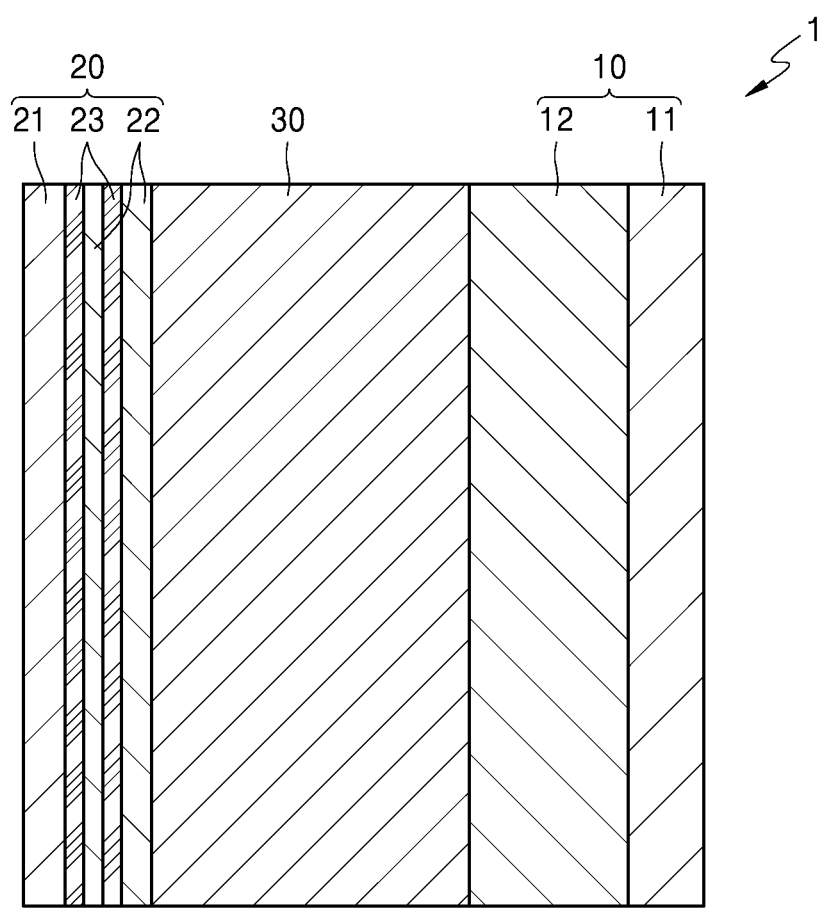
FIG. 4 is a cross-sectional view illustrating a modified example of an all-solid lithium secondary battery according to another embodiment.

The negative active material layer 22 may include a negative active material that may form an alloy or a compound with lithium. A combination comprising at least one negative active material may be used. In an initial state or in a fully discharged state, lithium may not be included between the negative current collector 21 and the negative active material layer 22, or between the negative active material layer 22 and the solid electrolyte layer 30. When the all-solid lithium secondary battery 1 according to an embodiment is overcharged, which will be further described below, the negative active material included in the negative active material layer 22 may react with lithium ions introduced from the positive electrode layer 10 to form an alloy or a compound, and thus a metal layer 23 including lithium, e.g., lithium as a primary component, may be formed in the negative electrode layer 20 as illustrated in FIG. 2 (deposition). The metal layer 23 may be deposited and located between the negative current collector 21 and the negative active material layer 22, inside the negative active material layer 22, or both, as shown in FIGS. 2 to 4. The metal layer 23, located between the negative current collector 21 and the negative active material layer 22, may be located closer to the negative current collector 21 than the negative active material layer 22.

The negative active material layer 22 according to an embodiment may include silver (Ag). Thus, the metal layer 23 formed during overcharge may include an Li(Ag) alloy having a $\gamma_1$-phase, a $\beta$-Li phase, or a combination thereof. The metal layer may comprise a solid solution of Ag in Li. Accordingly, during discharge, Li is ionized from the Li(Ag) alloy that constitutes the metal layer 23, and the solute Ag remains therein, thereby inhibiting formation of pores. In this case, in the deposited Li—Ag solid solution, the amount of Ag may be about 60 wt % or less, e.g. between about 10 wt % to about 60 wt %, between about 20 wt % and about 50 wt %, or between about 30 wt % to about 40 wt %, based on a total weight of the metal layer. Within such a range, a decrease in average discharge potential from the Ag may be effectively inhibited. Also, as the amount of Ag decreases in the deposited Li—Ag solid solution, the amount of Ag remaining during discharge decreases, failing to sufficiently inhibit formation of pores. Therefore, the amount of Ag included in the deposited Li—Ag solid solution may be about 20 wt % or more, e.g., about 40 wt % or more.

The metal layer 23 including the Li—Ag solid solution, having at least one of the $\gamma_1$-phase and the $\beta$-Li phase, may be analyzed by X-ray diffraction (XRD) and identified by analyzing peak positions and peak intensity ratios. In addition, the amount of Ag included in the deposited Li—Ag solid solution may be measured, for example, according to the following method. In an XRD measurement, pure lithium metal has different positions of diffraction peaks from those of the Li—Ag solid solution. The positions of diffraction peaks of the Li—Ag solid solution are closer to those of the pure lithium metal as the solid solubility of Ag decreases. For example, in the XRD analysis using a Cu target, as the solid solubility of Ag decreases, the diffraction peak observed at a diffraction angle (° 2θ) of about 37.0° 2θ is shifted to about 36.5° 2θ. At this peak position, the solid solubility of Ag may be estimated. In addition, the solid solubility may also be measured by inductively coupled plasma (ICP) analysis, or the like.

According to an embodiment, Ag is not uniformly dispersed in the negative active material layer 22, and may be locally distributed in the negative active material layer 22 at the side of the negative current collector 21. In this case, lithium reacted in the negative electrode layer 20 passes through the negative active material layer 22, arrives at the vicinity of the negative current collector 21, and reacts with Ag locally distributed in the negative active material layer 22 to form the Li(Ag) alloy as the metal layer 23.

As the amount of Ag included in the negative active material layer 22 decreases, the amount of Ag remaining during discharge also decreases, and can be insufficient to inhibit formation of pores. Thus, the amount of Ag included in the negative active material layer 22 may be about 10 wt % or more, e.g., about 20 wt % or more, about 30 wt % or more, or about 40 wt % or more, based on 100 wt % of a total amount of negative active material included therein, in an initial state, before charging and discharging occur.

In an aspect, an upper limit of the amount of Ag included in the negative active material layer 22 may be 100 wt %, based on the total weight of the negative active material. However, in regards to the reaction potentials between Ag and Li, as the amount of Ag increases, an average discharge potential may decrease, thereby decreasing energy density of the battery. Thus, to obtain high energy density, the amount of Ag may be about 80 wt % or less, e.g., about 70 wt % or less, about 60 wt % or less, or about 50 wt % or less, based on 100 wt % of a total amount of negative active material in the negative active material layer.

In the negative active material layer 22, the amount of Ag (wt %), based on 100 wt % of the total weight of the negative active material, may be measured according to the following method. That is, after discharging the all-solid lithium secondary battery 1, the all-solid lithium secondary battery 1 is disassembled and the negative active material layer 22 is collected from the surface of the negative electrode layer 20. Then, the amount of Ag contained in the collected negative active material layer 22 may be measured by energy-dispersive X-ray spectroscopy (EDX) analysis, X-ray fluorescence spectrometry (XRF), or inductively coupled plasma mass spectrometry (ICP). Also, for example, the amount of Ag may be measured by scanning electron microscopy (SEM)-energy dispersive spectroscopy (EDS) performed in a cross-sectional direction.

In addition, as the amount of Ag per unit area of the negative active material layer 22 in the lamination direction of the negative electrode layer 20 is very low, the amount of Ag remaining during discharge decreases, and can be insufficient to inhibit formation of pores. Thus, the amount of Ag per unit area of the negative active material layer 22 may be about 0.05 mg/cm$^2$ or more, for example, about 0.10 mg/cm$^2$ or more.

When the amount of Ag per unit area is very high, the average discharge potential decreases, thereby decreasing energy density of the battery. Thus, the amount of Ag per unit area may be about 5 mg/cm$^2$ or less, for example, about 0.01 mg/cm$^2$ to about 4 mg/cm$^2$, about 0.01 mg/cm$^2$ to about 3 mg/cm$^2$, or about 0.01 mg/cm$^2$ to about 2 mg/cm$^2$.

The amount of Ag per unit area of the negative active material layer 22 may be measured, for example, as follows. That is, the amount of Ag may be measured by disassembling the all-solid lithium secondary battery 1 after discharging the all-solid lithium secondary battery 1 and analyzing the composition thereof on the surface or in a cross-sectional direction of the negative electrode layer 20 by SEM-EDS. However, the embodiment is not limited thereto, and the amount of Ag may also be measured by XPS or ICP.

In addition, Ag included in the negative active material layer 22 may be in the form of a particle, or in the form of a film, in an initial state before charging and discharging occur. When present in the particle form, an average particle diameter $d_{50}$ (diameter or average diameter) of Ag may be in the range of about 20 nanometers (nm) to about 1 micrometer (μm), without being limited thereto.

The negative active material layer 22 may further include carbon, Au, Pt, Pd, Si, Al, Bi, Sn, In, Zn, or a combination thereof, in addition to Ag. Examples of the carbon may include amorphous carbon, carbon black such as acetylene black, furnace black, and Ketjen black, graphene, or a combination thereof.

The negative active material layer 22 may include about 50 wt % or more, e.g., about 70 wt % or more, about 80 wt % or more, or about 90% or more, of the negative active materials except for Ag based on 100 wt % of the total amount of the negative active materials. The amount of the negative active material, except for Ag, may be measured using the same method used to measure the amount of Ag.

The negative active material layer 22 may further include a binder. By including the binder, the negative active material layer 22 may be stabilized on the negative current collector 21. Materials constituting the binder may be a resin material, such as styrene butadiene rubber (SBR), polytetrafluoroethylene, polyvinylidene fluoride, or polyethylene. The binder may be formed of at least one of the resin materials.

Also, the negative active material layer 22 may further include an additive used in all-solid lithium secondary batteries, such as a filler, a dispersant, and ion-conductive agent, which are appropriated mixed therein. Detailed examples of the additive are as described above with reference to the positive electrode layer.

A thickness of the negative active material layer 22 may be in the range of about 1 μm to about 20 μm. When the thickness of the negative active material layer 22 is less than about 1 μm, performance of the all-solid lithium secondary battery 1 may not be sufficiently improved. When the thickness of the negative active material layer 22 is greater than about 20 μm, the negative active material layer 22 has a high resistance failing to sufficiently improve performance of the all-solid lithium secondary battery 1. By using the described binder, the thickness of the negative active material layer 22 may be easily adjusted to an appropriate level.

Also, a film including a material capable of forming an alloy or a compound with lithium may further be located on the negative current collector 21. The film may be disposed between the negative current collector 21 and the negative active material layer 22.

Although not reacting with lithium metal, the negative current collector 21 may make it difficult to deposit a smooth lithium metal layer thereon. The film may also be used as a wetting layer assisting the lithium metal to be deposited as a flat layer on the negative current collector 21.

The material capable of forming an alloy with lithium metal used in the film may include silicon, magnesium, aluminum, lead, silver, tin, or a combination thereof. The material capable of forming a compound with lithium metal used in the film may include carbon, titanium sulfide, iron sulfide, or a combination thereof. Amounts of the materials used to form the film may be small, within a range not affecting electrochemical properties of the electrodes and/or redox potentials of the electrodes. The film may be applied flat onto the negative current collector 21 to prevent cracks from occurring during charge cycles of the all-solid lithium secondary battery 1. The film may be applied by physical vapor deposition such as evaporation, sputtering, chemical deposition, or plating.

The thickness of the film may be in the range of about 1 nm to about 500 nm. The thickness of the film may be, for example, in the range of about 2 nm to about 400 nm. The thickness of the film may be, for example, in the range of about 3 nm to about 300 nm. The thickness of the film may be, for example, in the range of about 4 nm to about 200 nm. The thickness of the film may be, for example, in the range of about 5 nm to about 100 nm.

Solid Electrolyte Layer

The solid electrolyte layer 30 is located between the positive electrode layer 10 and the negative electrode layer 20 (e.g., between the positive active material layer 12 and the negative active material layer 22). The solid electrolyte layer 30 includes a solid electrolyte allowing migration of ions. The solid electrolyte layer 30 may include a sulfide-based solid electrolyte.

The sulfide-based solid electrolyte may include $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers and Z is Ge, Zn or Ga), $Li_2S$—$GeS_2$, $Li_2S$—$SiS_2$—$Li_3PO_4$, $Li_2S$—$SiS_2$—$Li_pMO_q$ (where p and q are positive numbers and M is P, Si, Ge, B, Al, Ga, or In), or a combination thereof. The solid electrolyte may be formed of one of or two or more of the above-described sulfide-based solid electrolyte materials. Halogens can be fluorine, chlorine, bromine, iodine, astatine, or tennessine.

The sulfide-based solid electrolyte may include a solid electrolyte represented by Formula 1:

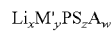

$Li_xM'_yPS_zA_w$  Formula 1

In Formula 1 x, y, z, and w are each independently 0 or more and about 6 or less, M' includes As, Ge, Ga, Sb, Si, Sn, Al, In, Ti, V, Nb, Ta, or a combination thereof, and A includes F, Cl, Br, I, or a combination thereof.

As the solid electrolyte, a sulfide-based solid electrolyte material including sulfur (S), phosphorus (P), and lithium (Li), as components, may be used. For example, a solid electrolyte including $Li_2S$—$P_2S_5$ may be used. When $Li_2S$—$P_2S_5$ is used as the sulfide-based solid electrolyte material, a molar ratio of $Li_2S$ to $P_2S_5$ may be, for example, about 50:50 to about 90:10 when mixing the components.

In addition, the solid electrolyte may be amorphous or crystalline. Also, the solid electrolyte may be in a mixed state of amorphous and crystalline states.

The solid electrolyte layer 30 may further include a binder. As a binder material, for example, styrene butadiene rubber (SBR), polytetrafluoroethylene, polyvinylidene fluoride, polyethylene, or polyacrylic acid, may be used. The binder material may be the same as or different from the material used to form the binder included in the positive active material layer 12 and the negative active material layer 22.

Initial Charge Capacity Ratio

In the all-solid lithium secondary battery 1 according to an embodiment, an initial charge capacity of the positive active material layer 12 is constructed to exceed an initial charge capacity of the negative active material layer 22. The all-solid lithium secondary battery 1 according to an embodiment may be charged to exceed the initial charge capacity of the negative active material layer 22 (i.e., overcharged) as is described below. In the initial stage of charging, lithium may be intercalated into the negative active material layer 22. That is, the negative active material may form an alloy or compound with lithium ions migrating from the positive electrode layer 10. When the charging is performed to exceed the initial charge capacity of the negative active material layer 22, lithium is deposited on a rear side of the negative active material layer 22, i.e., between the negative current collector 21 and the negative active material layer 22, thereby forming the metal layer 23 by lithium as illustrated in FIG. 2. The metal layer 23 may be mainly formed as a solid solution of Ag in Li (i.e., Ag—Li solid solution). This phenomenon indicates that the negative active material may be comprised of a material forming an alloy or a compound with lithium. During discharge, lithium may be ionized from the negative active material layer 22 and the metal layer 23 while Ag remains therein and migrates toward the positive electrode layer 10. Thus, lithium may be used as a negative active material in the all-solid lithium secondary battery 1. In addition, since the negative active material layer 22 coats the metal layer 23, the negative active material layer 22 may serve as a protective layer for the metal layer 23 and inhibit deposition and growth of dendritic lithium metal.

The all-solid lithium secondary battery 1 according to an embodiment may satisfy a ratio of an initial charge capacity of the negative active material layer 22 to an initial charge capacity of the positive active material layer 12, i.e. initial charge capacity ratio (b/a), represented by Equation 1:

$$0.01 \leq b/a \leq 0.5 \qquad \text{Equation 1}$$

where a is an initial charge capacity in milliampere hours (mAh) of the positive active material layer 12, and b is an initial charge capacity in milliampere hours (mAh) of the negative active material layer 22.

When the initial charge capacity ratio is about 0.01 or less, characteristics of the all-solid lithium secondary battery 1 may deteriorate. This is because, the negative active material layer 22 is not sufficiently functioning as a protective layer. For example, as the thickness of the negative active material layer 22 decreases, the capacity ratio may be about 0.01 or less. In this case, the negative active material layer 22 is destroyed and dendritic lithium metal may be deposited and grown by repeated charging and discharging. As a result, properties of the all-solid lithium secondary battery 1 may deteriorate. Therefore, the initial charge capacity ratio may be about 0.01 or greater. Also, when the initial charge capacity ratio is about 0.5 or more, the amount of lithium deposited on the negative electrode decreases, and thus battery capacity may decrease. Thus, initial charge capacity ratio may be less than about 0.5. An initial charge capacity ratio of about 0.01 to about 0.5, about 0.05 to about 0.4, or about 0.1 to about 0.4 is mentioned.

Configuration of All-Solid Lithium Secondary Battery

The all-solid lithium secondary battery 1 includes the positive electrode layer 10, the solid electrolyte layer 30, and the negative electrode layer 20, wherein the solid electrolyte layer is between the positive electrode layer and the negative electrode layer. The negative electrode layer 20 includes the negative current collector 21 and the negative active material layer 22, the negative active material layer 22 includes amorphous carbon (C) and silver (Ag), and the amount of the Ag is in the range of about 10 wt % to 100 wt %, based on 100 wt % of the total amount of the negative active materials included in the negative active material layer 22.

The negative current collector 21 may include an Ni foil, a Cu foil coated with Ni, a stainless steel foil, or a combination thereof. Discharge capacity of the negative current collector 21 may further be improved.

2. Manufacturing Method of All-Solid Lithium Secondary Battery

A method of manufacturing the all-solid lithium secondary battery 1 is described herein. The all-solid lithium secondary battery 1 according to an embodiment may be manufactured by separately preparing the positive electrode layer 10, the negative electrode layer 20, and the solid electrolyte layer 30, and laminating the layers.

Process of Manufacturing Positive Electrode Layer

First, materials constituting the positive active material layer 12 (a positive active material and a binder) are added to a nonpolar solvent to prepare a slurry or paste. Then, the obtained slurry is coated on the prepared positive current collector 11. The coated slurry is dried to obtain a laminated structure. Subsequently, the obtained laminated structure is pressed, for example, using a hydrostatic pressure, to obtain the positive electrode layer 10. The pressing process may be omitted.

Process of Manufacturing Negative Electrode Layer

First, materials constituting the negative active material layer 22 (a negative active material mainly including Ag, a binder, and the like) are added to a polar solvent or nonpolar solvent to prepare a slurry or paste. Then, the obtained slurry is coated on the prepared negative current collector 21. The coated slurry is dried to obtain a laminated structure. Subsequently, the obtained laminated structure is pressed, for example, using a hydrostatic pressure, to obtain the negative electrode layer 20. In addition, the pressing process may be omitted. A method of coating the slurry on the negative current collector 21 is not particularly limited and may be, for example, be carried out using screen printing, metal mask printing, electrostatic painting, dip coating, spray coating, roll coating, doctor blading, gravure coating, and the like.

Process of Manufacturing Solid Electrolyte Layer

The solid electrolyte layer 30 may be manufactured using a solid electrolyte including a sulfide-based solid electrolyte material.

First, a sulfide-based solid electrolyte material is prepared by treating starting materials, such as $Li_2S$ and $P_2S_5$, by melt quenching or mechanical milling.

For example, according to a melt quenching method, the starting materials are mixed in predetermined amounts and the mixture is compressed into pellets. The pellets are reacted at a reaction temperature in a vacuum and quenched to prepare a sulfide-based solid electrolyte material. In addition, a reaction temperature of the mixture of $Li_2S$ and $P_2S_5$ may be in the range of about 400° C. to about 1000° C., for example, in the range of about 800° C. to about 900° C. In addition, a reaction time may be in the range of about 0.1 hours to about 12 hours, for example, about 1 hour to about 12 hours. Furthermore, a temperature during the quenching of the reactants may be equal to or less than about 100° C., for example, equal to or less than 90° C., and a quenching rate may be in the range of about 1° C./sec to about 10000° C./sec, for example, about 1° C./sec to about 1000° C./sec.

In addition, a mechanical milling method can be used, wherein the starting materials are reacted by rotating using a ball mill, or the like to prepare a sulfide-based solid electrolyte material. In addition, a rotation speed and rotation time during the mechanical milling method are not particularly limited. However, as the rotation speed increases, a generation rate of the sulfide-based solid electrolyte material increases, and as the rotation time increases, a conversion rate of the starting materials into the sulfide-based solid electrolyte material may increase.

Then, the obtained mixed starting materials for the sulfide-based solid electrolyte material is heat-treated at a predetermined temperature and pulverized to prepare a solid electrolyte having a particle shape. When the solid electrolyte has a glass transition point, the structure thereof may change from amorphous to crystalline by heat treatment.

Subsequently, the solid electrolyte obtained according to the above-described method may be used to form the solid electrolyte layer 30 by using a known method for layer formation, such as aerosol depositing, cold spraying, and sputtering. Also, the solid electrolyte layer 30 may be manufactured by pressing particles of the solid electrolyte. In addition, the solid electrolyte layer 30 may be prepared by mixing a solid electrolyte, a solvent, and a binder, and then coating and drying the mixture.

Lamination Process

The all-solid lithium secondary battery 1 according to an embodiment may be obtained by locating the solid electrolyte layer 30 between the positive electrode layer 10 and the negative electrode layer 20 and pressing the structure using, for example, hydrostatic pressure. In addition, in the all-solid lithium secondary battery 1 according to an embodiment, there is no need to apply a high external pressure using an end plate, or the like and increased discharge capacity may be obtained by applying an external pressure of about 1 MPa or less to the positive electrode layer 10, the negative electrode layer 20, and the solid electrolyte layer 30 in use.

3. Method of Charging All-Solid Lithium Secondary Battery

A method of charging the all-solid lithium secondary battery 1 is described herein.

The method of charging the all-solid lithium secondary battery 1 according to an embodiment may include charging the all-solid lithium secondary battery 1 to exceed the charge capacity of the negative active material layer 22 (referred to as "overcharging"). In an aspect the method of charging comprises determining a charging capacity of the negative active material layer; and applying a current to the all-solid lithium secondary battery in an amount to exceed the capacity of the negative active material layer to charge the all-solid lithium secondary battery. A charge capacity of the negative active material may be determined by charging to a capacity at which lithium metal is deposited, or at which the electrochemical potential of the negative electrode is 0 volts versus Li/Li$^+$, or less.

In the initial stage of charging, lithium may be intercalated into the negative active material layer 22. When the charging is performed to exceed the initial charge capacity of the negative active material layer 22, lithium is deposited on a rear side of the negative active material layer 22, i.e., between the negative current collector 21 and the negative active material layer 22, and thus the metal layer 23, which was not present at the time of manufacture, is formed of lithium as illustrated in FIG. 2. During discharge, lithium may be ionized from the negative active material layer 22 and the metal layer 23 and migrate toward the positive electrode layer 10. Thus, lithium may be used as a negative active material in the all-solid lithium secondary battery 1. In addition, since the negative active material layer 22 coats the metal layer 23, the negative active material layer 22 may serve as a protective layer for the metal layer 23 and inhibit deposition and growth of dendritic lithium metal. In this manner, short-circuits and decrease in capacity may be inhibited in the all-solid lithium secondary battery 1, and thus properties of the all-solid lithium secondary battery 1 may be improved. Also, according to an embodiment, because the metal layer 23 is not pre-formed, manufacturing costs of the all-solid lithium secondary battery 1 may be reduced.

In addition, the position of the metal layer 23 is not limited to between the negative current collector 21 and the negative active material layer 22 as illustrated in FIG. 2, and the metal layer 23 may also be formed inside the negative active material layer 22 as shown in FIG. 3. Also, as shown in FIG. 4, the metal layer 23 may be formed both between the negative current collector 21 and the negative active material layer 22 and inside the negative active material layer 22.

The all-solid lithium secondary battery 1 may be a unit cell having a positive electrode/separator/negative electrode structure, a bi-cell having a positive electrode/separator/negative electrode/separator/positive electrode structure, or a laminated battery having a repeated cell structure as described above.

The shape of the all-solid lithium secondary battery 1 is not particularly limited, the all-solid lithium secondary battery 1 may have any of various forms, and for example, may be in the form of a coin, a button, a sheet, a laminate, a cylinder, a plane, or a horn. Also, the all-solid lithium secondary battery 1 may be applied to large-sized batteries used in electric vehicles. For example, the all-solid lithium secondary battery 1 may be applied to hybrid electric vehicles such as plug-in hybrid electric vehicles (PHEVs). Also, the all-solid lithium secondary battery 1 may be used in fields requiring a large amount of power storage. For example, the all-solid lithium secondary battery 1 may be used in E-bikes and electric tools.

Hereinafter, the present disclosure will be described in more detail according to the following examples and comparative examples. However, the following examples are merely presented to exemplify the present disclosure, and the scope of the present disclosure is not limited thereto. The following examples may be modified within the scope appropriate to the spirit of the present disclosure, all of which are included in the technical scope of the present disclosure.

EXAMPLES

Example 1

1. Preparation of Sample

All-solid lithium secondary battery samples (Sample Nos. 1 to 37) including amorphous carbon as a negative active material were respectively prepared in an argon gas atmosphere in the following order. Each of the all-solid lithium secondary battery samples including amorphous carbon were prepared in the same manner except that the negative electrode layer was prepared in the same manner as in the process of manufacturing the negative electrode layer.

Preparation of Positive Electrode Layer

As a positive active material, $LiNi_{0.8}Co_{0.15}Al_{0.05}O_2$ (NCA) was prepared. The positive active material was coated with $Li_2O$—$ZrO_2$ using the method described in "Synthesis and Electrochemical Properties of $I_4^-$-type $Li_{1+2x}Zn_{1-x}PS_4$ Solid Electrolyte," by Naoki Suzuki, et al., Chemistry of Materials, Mar. 9, 2018, No. 30, 2236-2244, 2018, the content of which is incorporated herein by reference in its entirety. Argyrodite-type crystals of $Li_6PS_5Cl$ were prepared as a solid electrolyte. As a binder, polytetrafluoroethylene (DUPONT Co., Ltd., Teflon®) was prepared. Also, as a conductive agent, carbon nanofiber (CNF) was prepared. These materials were mixed such that a weight ratio of the positive active material, the solid electrolyte, the conductive agent, and the binder was 88:12:2:1.

The mixture was stretched in a sheet form to prepare a positive active material sheet. Then, the positive active material sheet was molded to about 1.7 cm$^2$ and pressed onto an 18 μm-thick Al foil, as a positive current collector, to prepare a positive electrode layer used in Sample Nos. 1 to 37.

Preparation of Negative Electrode Layer
Preparation of Sample Nos. 1 and 2

A Li metal foil having a thickness of 30 μm was laminated respectively on a 10 μm-thick Ni foil, as a negative current collector to prepare a laminated structure (Sample No. 1) and on a 10 μm-thick SUS304 foil, as a negative current collector, to prepare a laminated structure (Sample No. 2). Each laminated structure was punched to provide an area of about 2 cm$^2$ to prepare a negative electrode layer. Also, the negative electrode layer has a protrusion used as a negative electrode terminal of the battery which will be described later. As a result, the negative electrode layers used in Sample Nos. 1 and 2 were manufactured.

Sample Nos. 3 to 13 and 15 to 37

A binder dissolved in a N-methyl pyrrolidone (NMP) solution was prepared (Kureha Corporation, #9300). After adding the negative active material shown in Table 1 to the binder, the mixed solution was stirred while adding NMP thereto little by little to prepare a slurry. Then, the slurry, as a negative active material layer, was applied to the negative current collector of the 10 μm-thick SUS304 foil by screen printing. Here, the amount of the negative active material in the negative active material layer of each sample and the thickness of the negative active material layer is listed in Table 1. In Table 1, CB refers to carbon black, and the amount of Ag per unit area refers to an amount of Ag per unit area in a lamination direction of the negative electrode layer (i.e., a direction perpendicular to the surface of the slurry on the negative current collector). Then, the structure was dried in the air at about 80° C. for about 20 minutes, and then dried in a vacuum at 100° C. for about 12 hours to obtain a laminated structure. The laminated structure was punched to have an area of about 2 cm$^2$ to prepare a negative electrode layer. also, the negative electrode layer has a protrusion used as a negative electrode terminal of the battery which will be described later. As a result, the negative electrode layer used in Sample Nos. 3 to 13 and 15 to 37 was manufactured.

In addition, in Sample Nos. 3 to 9, 11, 13, and 15 to 37, the slurry was applied to the negative current collector as a single layer by uniformly diffusing the negative active material. In Sample Nos. 10 and 12, slurries including different amounts of the negative active material were applied to the negative current collector as a double layer. Sample No. 10 was prepared by first applying a slurry including only carbon black as a negative active material (60 wt % based on 100 wt % of the total amount of the negative active material included in the negative active material layer) to the negative current collector, and then applying a slurry including carbon black (20 wt %) and Ag (20 wt %) as negative active materials thereto. Sample No. 12 was prepared by first applying a slurry including carbon black (20 wt %) and Ag (20 wt %) as negative active materials on the negative current collector, and then applying a slurry including only carbon black (60 wt %) as a negative active material thereto. Sample No. 14 was prepared by laminating a foil plated with Ag, as a negative active material, on a negative current collector, and applying a slurry including only CB thereto.

TABLE 1

| Example, Sample No. | Negative active | Ag (wt %) | CB (wt %) | Other negative active (wt %) | Ag per unit area (mg/cm$^2$) | Layer Thickness (μm) | Prep'n method | Layer structure | Remarks |
|---|---|---|---|---|---|---|---|---|---|
| CEx 1 | None | — | — | — | — | — | — | Ni foil | |
| CEx 2 | None | — | — | — | — | 0 | — | Li foil | |
| Ex 3 | CB + Ag | 25 | 75 | 0 | 0.25 | 10 | Screen | Single | |
| CEx 5 | CB + Zn | — | 75 | Zn: 25 | — | 13 | Screen | Single | |
| CEx 5 | CB + Sn | — | 75 | Sn: 25 | — | 15 | Screen | Single | |
| CEx 6 | CB + Si | — | 75 | Si: 25 | — | 9 | Screen | Single | |
| CEx 7 | CB + Si | — | 90 | Si: 10 | — | 15 | Screen | Single | |
| CEx 8 | CB + Al | — | 75 | Al: 25 | — | 15 | Screen | Single | |
| Ex 9 | CB + Ag | 25 | 75 | — | 0.25 | 10 | Screen | Single | |
| Ex 10 | CB + Ag | 20 | 80 | — | 0.22 | 15 | Screen | Double-layered coating | Solid electrolyte side: CB: 20 wt %, Ag: 20 wt % Negative current collector side: CB: 60 wt % |
| Ex 11 | CB + Ag | 20 | 80 | — | 0.24 | 15 | Screen | Single | |
| Ex 12 | CB + Ag | 20 | 80 | — | 0.20 | 13 | Screen | Double-layered coating | Solid electrolyte side: CB: 60 wt % Negative current collector side: CB: 20 wt %, Ag: 20 wt % |
| Ex 13 | CB + Ag | 10 | 90 | — | 0.11 | 18 | Screen | Single | |
| Ex 14 | CB + Ag | 10 | 90 | — | 0.06 | 10 | Plating + Screen | Single | Applied CB to a foil plated with Ag |
| Ex 15 | CB + Ag + Si | 7.5 | 75 | Si: 17.5 | 0.07 | 14 | Screen | Single | |
| Ex 16 | CB + Ag + Si | 12.5 | 75 | Si: 12.5 | 0.10 | 12 | Screen | Single | |
| Ex 17 | CB + Ag + Si | 17.5 | 75 | Si: 7.5 | 0.16 | 12 | Screen | Single | |
| Ex 18 | CB + Ag + Si | 22.5 | 75 | Si: 2.5 | 0.20 | 11 | Screen | Single | |
| Ex 19 | CB + Ag | 25 | 75 | — | 0.25 | 10 | Screen | Single | |
| Ex 20 | CB + Ag | 25 | 75 | — | 1.13 | 45 | Screen | Single | |

TABLE 1-continued

| Example, Sample No. | Negative active | Ag (wt %) | CB (wt %) | Other negative active (wt %) | Ag per unit area (mg/cm$^2$) | Layer Thickness (μm) | Prep'n method | Layer structure | Remarks |
|---|---|---|---|---|---|---|---|---|---|
| Ex 21 | CB + Ag | 25 | 75 | — | 0.83 | 31 | Screen | Single | |
| Ex 22 | CB + Ag | 25 | 75 | — | 0.50 | 19 | Screen | Single | |
| Ex 23 | CB + Ag | 25 | 75 | — | 0.25 | 10 | Screen | Single | |
| Ex 24 | CB + Ag | 25 | 75 | — | 0.10 | 5 | Screen | Single | |
| Ex 25 | CB + Ag | 25 | 75 | — | 0.05 | 2 | Screen | Single | |
| Ex 26 | Ag | 100 | — | — | 2.80 | 10 | Screen | Single | |
| Ex 27 | CB + Ag | 83 | 17 | — | 1.83 | 11 | Screen | Single | |
| Ex 28 | CB + Ag | 80 | 20 | — | 1.52 | 10 | Screen | Single | |
| Ex 29 | CB + Ag | 75 | 25 | — | 1.13 | 9 | Screen | Single | |
| Ex 30 | CB + Ag | 67 | 33 | — | 0.94 | 9 | Screen | Single | |
| Ex 31 | CB + Ag | 50 | 50 | — | 0.60 | 9 | Screen | Single | |
| Ex 32 | CB + Ag | 33 | 67 | — | 0.30 | 9 | Screen | Single | |
| Ex 33 | CB + Ag | 25 | 75 | — | 0.25 | 10 | Screen | Single | |
| Ex 34 | CB + Ag | 20 | 80 | — | 0.24 | 15 | Screen | Single | |
| Ex 35 | CB + Ag | 17 | 83 | — | 0.19 | 16 | Screen | Single | |
| Ex 36 | CB + Ag | 10 | 90 | — | 0.11 | 18 | Screen | Single | |
| CEx 37 | CB | — | 100 | — | — | 24 | Screen | Single | |

CEx = Comparative Example
Ex = Example

Preparation of Solid Electrolyte Layer 1 wt % of a rubber-based binder was added to a Li$_6$PS$_5$Cl solid electrolyte based on 100 wt % of the total amount of the solid electrolyte. The mixture was stirred while adding xylene and diethyl benzene thereto to prepare a slurry. The slurry was applied to a non-woven fabric by using a blade coater and dried in the air at 40° C. A laminated structure obtained thereby was dried in a vacuum at 40° C. for 12 hours. The laminated structure was punched to about 2.2 cm$^2$ to prepare a solid electrolyte layer used in Sample Nos. 1 to 37.

Preparation of All-Solid Lithium Secondary Battery

The prepared positive electrode layer, the solid electrolyte layer, and the negative electrode layer, wherein the solid electrolyte layer is between the positive electrode layer and the negative electrode layer, were sealed by a laminate film in a vacuum to prepare the all-solid lithium secondary battery samples (Examples Nos. 1 to 37). In this regard, a portion of each of the positive current collector and the negative current collector was protruded out of the laminate film without breaking the vacuum of the battery. The protrusions were used as terminals of a positive electrode layer and a negative electrode layer. In addition, the all-solid lithium secondary battery was treated with a hydrostatic pressure of 490 MPa for 30 minutes. Then, the samples were not provided with an end plate inserted and pressure was not applied thereto. That is, an external pressure applied to each sample was 1 MPa or less (specifically, about atmospheric pressure).

4. Charging and Discharging Test

The prepared Examples Nos. 1 to 37 of the all-solid lithium secondary batteries were subjected to a charging and discharging test according to the following experimental method to evaluate battery properties (e.g., discharge capacity).

Specifically, each of the prepared all-solid lithium secondary batteries was placed in a thermostat at 60° C. and the battery properties were evaluated. The all-solid lithium secondary battery was charged at a constant current of 0.6 milliamperes per square centimeter (mA/cm$^2$) until the voltage reached 4.25 volts (V) and then charged at a constant voltage of 4.25 V until the current reached 0.5 milliamperes (mA) in a first cycle (CCCV). Subsequently, the all-solid lithium secondary battery was discharged at a constant current of 1.2 mA/cm$^2$ until the voltage reached 2.5 V (0.2C discharge). A C rate discharge represents a discharge rate which refers to the current that will discharge a battery in one hour. For example, a C rate for a battery having a discharge capacity of 1.6 ampere-hours would be 1.6 amperes. At a 2$^{nd}$ cycle and 3$^{rd}$ cycle, the all-solid lithium secondary battery was charged under the same conditions as those of the 1$^{st}$ cycle. In addition, the all-solid lithium secondary battery was discharged at a constant current of 2.0 mA/cm$^2$ until the voltage reached 2.5 V (0.33C discharge) at the 2$^{nd}$ cycle. At the 3$^{rd}$ cycle, the all-solid lithium secondary battery was discharged at a constant current of 6.0 mA/cm$^2$ until the voltage reached 2.5 V (1C discharge). The results are shown in Table 2.

A discharge capacity of 100 milliampere hour per gram (mAh/g) or more at the 0.2C discharge was evaluated as good discharge capacity (marked with ○ in Table 2). Also, a discharge capacity of 100 mAh/g or more at the 1C discharge that is the most easily affected when an external pressure was not applied thereto was evaluated as excellent discharge capacity (marked with ⊚ in Table 2).

TABLE 2

| Example | Sample No. | Charge capacity (mAh/g) | Discharge capacity at 0.2 C (mAh/g) | 0.33 C Discharge (mAh/g) | 1 C Discharge (mAh/g) | 1 C Discharge/ 0.33 C Discharge (%) | Rating |
|---|---|---|---|---|---|---|---|
| Comparative Example | 1 | 235 | 36 | 1 | 0 | 22.2 | X |
| Comparative Example | 2 | 235 | 55 | 2 | 0 | 6.7 | X |
| Example | 3 | 235 | 206 | 193 | 139 | 71.8 | ⊚ |

TABLE 2-continued

| Example | Sample No. | Charge capacity (mAh/g) | Discharge capacity at 0.2 C (mAh/g) | 0.33 C Discharge (mAh/g) | 1 C Discharge (mAh/g) | 1 C Discharge/ 0.33 C Discharge (%) | Rating |
|---|---|---|---|---|---|---|---|
| Comparative Example | 4 | 235 | 64 | 16 | 7 | 39.9 | X |
| Comparative Example | 5 | 235 | 75 | 25 | 12 | 46.2 | X |
| Comparative Example | 6 | 235 | 66 | 17 | 5 | 29.4 | X |
| Comparative Example | 7 | 235 | 53 | 13 | 4 | 33.3 | X |
| Comparative Example | 8 | 235 | 99 | 39 | 22 | 55.3 | X |
| Example | 9 | 235 | 206 | 193 | 139 | 71.8 | ⊚ |
| Example | 10 | 235 | 206 | 195 | 138 | 70.8 | ⊚ |
| Example | 11 | 235 | 207 | 195 | 136 | 69.7 | ⊚ |
| Example | 12 | 235 | 207 | 194 | 135 | 69.6 | ⊚ |
| Example | 13 | 235 | 103 | 44 | 18 | 40.9 | ○ |
| Example | 14 | 235 | 133 | 66 | 24 | 36.4 | ○ |
| Example | 15 | 235 | 195 | 146 | 87 | 59.6 | ○ |
| Example | 16 | 235 | 202 | 178 | 126 | 70.8 | ⊚ |
| Example | 17 | 235 | 204 | 189 | 133 | 70.4 | ⊚ |
| Example | 18 | 235 | 207 | 194 | 136 | 70.1 | ⊚ |
| Example | 19 | 235 | 206 | 193 | 139 | 71.8 | ⊚ |
| Example | 20 | 235 | 195 | 168 | 103 | 61.3 | ⊚ |
| Example | 21 | 235 | 201 | 179 | 125 | 69.8 | ⊚ |
| Example | 22 | 235 | 203 | 189 | 135 | 71.4 | ⊚ |
| Example | 23 | 235 | 206 | 193 | 139 | 71.8 | ⊚ |
| Example | 24 | 235 | 207 | 191 | 139 | 72.8 | ⊚ |
| Example | 25 | 235 | 208 | 193 | — | — | ○ |
| Example | 26 | 235 | 150 | 87 | 11 | 12.9 | ○ |
| Example | 27 | 235 | 188 | 105 | 33 | 31.4 | ○ |
| Example | 28 | 235 | 201 | 188 | 131 | 69.7 | ⊚ |
| Example | 29 | 235 | 206 | 193 | 137 | 71.0 | ⊚ |
| Example | 30 | 235 | 205 | 193 | 139 | 72.0 | ⊚ |
| Example | 31 | 235 | 206 | 194 | 138 | 71.1 | ⊚ |
| Example | 32 | 235 | 205 | 193 | 139 | 72.3 | ⊚ |
| Example | 33 | 235 | 206 | 193 | 139 | 71.8 | ⊚ |
| Example | 34 | 235 | 207 | 195 | 136 | 69.7 | ⊚ |
| Example | 35 | 235 | 194 | 166 | 68 | 41.0 | ○ |
| Example | 36 | 235 | 103 | 44 | 18 | 40.9 | ○ |
| Comparative Example | 37 | 235 | 60 | 14 | 6 | 42.9 | X |

5. Evaluation

As shown in Tables 1 and 2, Sample Nos. 3 and 9 to 36 are all-solid lithium secondary batteries including a negative active material layer containing Ag. It was confirmed that these all-solid lithium secondary battery samples have a discharge capacity of 100 mAh/g or more at the 0.2C discharge rate and exhibit high discharge capacity without applying a high external pressure thereto.

Sample Nos. 9 to 12, including carbon black and Ag as the negative active materials, in which the amount of Ag is in the range of 20 wt % to 25 wt %, exhibit higher discharge capacity than Sample Nos. 13 and 14, which contain 10 wt % of Ag. This is because, in comparison with Sample Nos 13 and 14, an increased amount of Ag in the negative electrode layer of Sample Nos. 9 to 12 more efficiently inhibits formation of pores during discharge.

Sample Nos. 16 to 18, including carbon black, Ag, and Si as negative active materials, wherein the amount of Si is 12.5 wt % or less, have higher discharge capacity than Sample No. 15, including Si in an amount of greater than 12.5 wt %. This is because, in comparison with Sample No. 15, Sample Nos. 16 to 18 include a larger amount of Ag in the negative electrode layer, thereby inhibiting formation of pores more efficiently.

Sample Nos. 20 to 24 including carbon black (75 wt %) and Ag (25 wt %) as the negative active materials in which an amount of Ag per unit area is in the range of 0.1 mg/cm² to 2.0 mg/cm², have higher discharge capacity than Sample No. 25, in which the amount of Ag per unit area is less than 0.1 mg/cm². This is because, in comparison with Sample no. 25, Sample Nos. 20 to 24 include a greater amount of Ag per unit area in the negative electrode layer, thereby inhibiting formation of pores more efficiently.

Sample Nos. 28 to 34, including carbon black and Ag as the negative active materials in which the amount of Ag is in the range of 20 wt % to 80 wt %, have higher discharge capacity than Sample Nos 26 and 27 having the amount of Ag greater than 80 wt % (100 wt %), and Sample Nos. 35 and 36 having the amount of Ag less than 20 wt %. The negative electrode layer of Sample Nos. 26 and 27 is primarily formed of Ag, and, while not wanting to be bound by theory, it is understood that the negative electrode layer deteriorates due to expansion and shrinkage caused by reaction between Ag and Li occurring during charge and discharge. Also, the negative electrode layer of Sample Nos. 35 and 36, having a smaller amount of Ag, is primarily formed of CB having a large specific surface area, and thus it is considered that deterioration of the negative electrode layer is caused during charge and discharge by reduced strength of the negative electrode layer due to shortage of the binder.

Sample Nos. 1, 2, 4 to 8 and 37 are all-solid lithium secondary batteries not including Ag in the negative active material according to the comparative examples.

All of the all-solid lithium secondary batteries of Sample Nos. 1 and 2 do not comprise a negative active material. Thus, pores are formed in the negative electrode layer during charge and discharge at the $1^{st}$ cycle, failing to perform charging of the $2^{nd}$ cycle.

The all-solid lithium secondary batteries of Sample Nos. 4 to 8 include carbon black (CB) and a metal other than Ag as the negative active materials. In addition, the all-solid lithium secondary battery of Sample No. 37 includes only carbon black (CB) as the negative active material and did not exhibit high discharge capacity.

According to the disclosed embodiment, an all-solid lithium secondary battery exhibiting high discharge capacity without applying a high external pressure thereto may be provided.

It should be understood that embodiments described herein should be considered in a descriptive sense only and not for purposes of limitation. Descriptions of features, aspects, or advantages within each embodiment should be considered as available for other similar features, aspects, or advantages in other embodiments. While embodiments have been described with reference to the figures, it will be understood by those of ordinary skill in the art that various changes in form and details may be made therein without departing from the spirit and scope as defined by the following claims.

What is claimed is:

1. An all-solid lithium secondary battery comprising:
    a positive active material layer;
    a solid electrolyte layer; and
    a negative active material layer, which is capable of forming an alloy or a compound with lithium,
    wherein the solid electrolyte layer is between the positive active material layer and the negative active material layer, and
    wherein the negative active material layer comprises silver, and an amount of the silver per unit area in the negative active material layer is in a range of about 0.05 milligrams per square centimeter to about 5 milligrams per square centimeter, based on a total weight of the negative active material layer.

2. The all-solid lithium secondary battery of claim 1, wherein an amount of the silver is in a range of about 10 weight percent to about 100 weight percent, based on 100 weight percent of a total amount of negative active material included in the negative active material layer.

3. The all-solid lithium secondary battery of claim 1, wherein the amount of the silver is in a range of about 20 weight percent to about 80 weight percent, based on 100 weight percent of the total amount of the negative active material included in the negative active material layer.

4. The all-solid lithium secondary battery of claim 1, wherein the amount of the silver per unit area in the negative active material layer is in a range of about 0.1 milligrams per square centimeter to about 2 milligrams per square centimeter, based on the total weight of the negative active material layer.

5. The all-solid lithium secondary battery of claim 1, wherein the negative active material layer further comprises carbon, gold, platinum, palladium, silicon, aluminum, bismuth, tin, indium, zinc, or a combination thereof.

6. The all-solid lithium secondary battery of claim 5, wherein the carbon comprises amorphous carbon, carbon black, graphene, or a combination thereof.

7. The all-solid lithium secondary battery of claim 1, wherein the negative active material layer comprises silver in the form of silver particles disposed therein, or wherein the negative active material comprises silver in the form of a silver layer disposed thereon.

8. The all-solid lithium secondary battery of claim 1, wherein the negative active material layer has a thickness of about 1 micrometer to about 20 micrometers.

9. The all-solid lithium secondary battery of claim 1, further comprising a negative current collector,
    wherein lithium is not included between the negative current collector and the negative active material layer, or wherein lithium is not included between the negative active material layer and the solid electrolyte layer, when the all-solid lithium secondary battery is in an initial state or in a fully discharged state.

10. The all-solid lithium secondary battery of claim 1, further comprising a negative current collector,
    wherein, in an overcharged state, a metal layer comprising lithium is disposed between the negative current collector and the negative active material layer, inside the negative active material layer, or a combination thereof.

11. The all-solid lithium secondary battery of claim 10, wherein the metal layer comprising lithium is disposed between the negative current collector and the negative active material layer.

12. The all-solid lithium secondary battery of claim 10, wherein the metal layer comprising lithium comprises a lithium-silver alloy including a $\gamma_1$-phase, a $\beta$-Li phase, or a combination thereof.

13. The all-solid lithium secondary battery of claim 12, wherein the lithium-silver alloy comprises a lithium-silver solid solution.

14. The all-solid lithium secondary battery of claim 1, further comprising
    a negative current collector on the negative active material layer, and
    a film comprising a material capable of forming an alloy or a compound with lithium and disposed on the negative current collector,
    wherein the film is disposed between the negative current collector and the negative active material layer.

15. The all-solid lithium secondary battery of claim 14, wherein a thickness of the film is in the range of about 1 nanometer to about 500 nanometers.

16. The all-solid lithium secondary battery of claim 1, wherein the solid electrolyte layer comprises a sulfide solid electrolyte.

17. The all-solid lithium secondary battery of claim 16, wherein the sulfide solid electrolyte comprises $Li_2S$—$P_2S_5$, $Li_2S$—$P_2S_5$—LiX wherein X is a halogen, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ wherein m and n are positive numbers and Z is Ge, Zn or Ga, $Li_2S$—$GeS_2$, $Li_2S$—$SiS_2$—$Li_3PO_4$, $Li_2S$—$SiS_2$—$Li_pMO_q$ wherein p and q are positive numbers and M is P, Si, Ge, B, Al, Ga, or In, or a combination thereof.

18. The all-solid lithium secondary battery of claim 16, wherein the sulfide solid electrolyte comprises a solid electrolyte represented by Formula 1:

$$Li_xM'_yPS_zA_w \quad \text{Formula 1}$$

wherein in Formula 1,
    x, y, z, and w are each independently 0 to about 6,
    M' comprises As, Ge, Ga, Sb, Si, Sn, Al, In, Ti, V, Nb, Ta, or a combination thereof, and
    A comprises F, Cl, Br, I, or a combination thereof.

19. The all-solid lithium secondary battery of claim 1, wherein an external pressure applied to the positive active material layer, the solid electrolyte layer, and the negative active material layer is about 1 megapascal or less.

20. The all-solid lithium secondary battery of claim 10, wherein the metal layer comprising lithium is disposed inside the negative active material layer, and the metal layer is closer to the negative current collector layer than the solid electrolyte.

21. An all-solid lithium secondary battery comprising:
a positive electrode layer;
a solid electrolyte layer; and
a negative electrode layer,
wherein the solid electrolyte layer is between the positive electrode layer and the negative electrode layer,
wherein the negative electrode layer comprises a negative current collector and a negative active material layer,
the negative active material layer comprises amorphous carbon and silver,
the negative active material comprises the silver in a range of about 10 weight percent to about 100 weight percent, based on 100 weight percent of a total amount of negative active material included in the negative active material layer, and
an amount of the silver per unit area in the negative active material layer is in a range of about 0.05 milligrams per square centimeter to about 5 milligrams per square centimeter, based on a total weight of the negative active material layer.

22. The all-solid lithium secondary battery of claim 21, wherein the negative current collector comprises nickel foil, copper foil coated with nickel, stainless steel foil, or a combination thereof.

23. A method of charging the all-solid lithium secondary battery according to claim 1, the method comprising:
determining a charging capacity of the negative active material layer; and
applying a current to the all-solid lithium secondary battery in an amount to exceed the capacity of the negative active material layer to charge the all-solid lithium secondary battery.

24. The method of claim 23, wherein a charging amount of the all-solid lithium secondary battery is about 2 times to about 100 times greater than the charging capacity of the negative active material layer.

* * * * *